United States Patent
Ibrahim et al.

(10) Patent No.: US 8,000,653 B2
(45) Date of Patent: *Aug. 16, 2011

(54) METHOD AND SYSTEM FOR SELECTIVE EQUALIZATION ENABLEMENT BASED ON MODULATION TYPE

(75) Inventors: Brima Ibrahim, Aliso Viejo, CA (US); Hea Joung Kim, Irvine, CA (US); Paul Lettieri, Lake Forest, CA (US)

(73) Assignee: Broadcom Corporation, Irvine, CA (US)

( * ) Notice: Subject to any disclaimer, the term of this patent is extended or adjusted under 35 U.S.C. 154(b) by 30 days.

This patent is subject to a terminal disclaimer.

(21) Appl. No.: 12/538,444

(22) Filed: Aug. 10, 2009

(65) Prior Publication Data
US 2009/0296801 A1    Dec. 3, 2009

Related U.S. Application Data

(63) Continuation of application No. 11/112,983, filed on Apr. 11, 2005, now Pat. No. 7,574,175.

(60) Provisional application No. 60/623,956, filed on Nov. 1, 2004.

(51) Int. Cl.
*H04B 7/00* (2006.01)

(52) U.S. Cl. ........... 455/41.2; 455/17; 455/61; 370/204; 375/346

(58) Field of Classification Search ............... 455/17, 455/41.2, 61, 102; 370/204, 206, 252; 375/346, 375/232

See application file for complete search history.

(56) References Cited

U.S. PATENT DOCUMENTS

| | | | | |
|---|---|---|---|---|
| 5,048,055 | A * | 9/1991 | Creigh et al. | 375/229 |
| 5,166,806 | A * | 11/1992 | Ebisawa et al. | 386/90 |
| 5,311,557 | A * | 5/1994 | Betts et al. | 375/341 |
| 5,455,844 | A * | 10/1995 | Ishikawa et al. | 375/232 |
| 5,541,956 | A * | 7/1996 | Ueda | 375/232 |
| 5,550,868 | A * | 8/1996 | Boccuzzi | 375/330 |
| 5,583,562 | A * | 12/1996 | Birch et al. | 725/151 |
| 5,644,597 | A * | 7/1997 | Ueda | 375/232 |
| 5,673,293 | A * | 9/1997 | Scarpa et al. | 375/321 |
| 5,912,921 | A * | 6/1999 | Warren et al. | 375/220 |
| 6,002,723 | A * | 12/1999 | Chethik | 375/317 |
| 6,032,029 | A * | 2/2000 | Futagi et al. | 455/130 |
| 6,167,081 | A * | 12/2000 | Porter et al. | 375/232 |
| 6,216,244 | B1 * | 4/2001 | Myers et al. | 714/746 |
| 6,243,415 | B1 * | 6/2001 | Pipon et al. | 375/232 |
| 6,275,506 | B1 * | 8/2001 | Fazel et al. | 370/478 |
| 6,363,112 | B1 * | 3/2002 | Azadet et al. | 375/233 |
| 6,442,129 | B1 * | 8/2002 | Yonge et al. | 370/204 |
| 6,442,146 | B1 * | 8/2002 | Onodera et al. | 370/321 |

(Continued)

OTHER PUBLICATIONS

Steven Hall, "Radio Frequency Change Request for Medium Rate IP, Bluetooth Specification v 1.2", 2003.

(Continued)

*Primary Examiner* — Minh D Dao
(74) *Attorney, Agent, or Firm* — McAndrews, Held & Malloy, Ltd.

(57) ABSTRACT

Aspects of a method and system for selective equalization enablement based on modulation type may be found in a method for processing a radio frequency (RF) signal that comprises receiving a Bluetooth signal via an RF channel, detecting a modulation type of the received Bluetooth signal, and selecting an equalization circuit for processing the received Bluetooth signal based on the detected modulation type. The method may also comprise determining a data rate based on the detected modulation type.

22 Claims, 6 Drawing Sheets

U.S. PATENT DOCUMENTS

| | | | |
|---|---|---|---|
| 6,597,733 B2 * | 7/2003 | Pollmann et al. | 375/222 |
| 6,628,706 B1 * | 9/2003 | Lindoff | 375/231 |
| 6,647,077 B1 * | 11/2003 | Shan et al. | 375/346 |
| 6,665,336 B2 * | 12/2003 | Abdelilah et al. | 375/225 |
| 6,791,995 B1 * | 9/2004 | Azenkot et al. | 370/436 |
| 6,823,017 B1 * | 11/2004 | Davis et al. | 375/245 |
| 6,870,892 B2 * | 3/2005 | Strolle et al. | 375/347 |
| 6,904,110 B2 * | 6/2005 | Trans et al. | 375/350 |
| 6,970,523 B2 * | 11/2005 | Strolle et al. | 375/345 |
| 7,027,503 B2 * | 4/2006 | Smee et al. | 375/233 |
| 7,027,539 B2 * | 4/2006 | Yang et al. | 375/350 |
| 7,058,114 B2 * | 6/2006 | Dabak et al. | 375/136 |
| 7,059,599 B2 | 6/2006 | Lewis | |
| 7,065,136 B1 * | 6/2006 | Porter et al. | 375/232 |
| 7,068,711 B2 * | 6/2006 | Huang et al. | 375/219 |
| 7,079,599 B2 * | 7/2006 | Karaoguz | 375/329 |
| 7,483,478 B2 * | 1/2009 | Kikugawa et al. | 375/229 |
| 7,574,175 B2 * | 8/2009 | Ibrahim et al. | 455/41.2 |
| 7,616,726 B2 * | 11/2009 | Minemura et al. | 375/376 |
| 2002/0075904 A1 * | 6/2002 | Dabak et al. | 370/510 |
| 2002/0154688 A1 * | 10/2002 | Pollmann et al. | 375/229 |
| 2003/0174761 A1 * | 9/2003 | Huang et al. | 375/219 |
| 2003/0198288 A1 * | 10/2003 | Abdelilah et al. | 375/222 |
| 2003/0223489 A1 * | 12/2003 | Smee et al. | 375/233 |
| 2003/0231708 A1 * | 12/2003 | Kim et al. | 375/232 |
| 2004/0037380 A1 * | 2/2004 | Shan | 375/346 |
| 2004/0179483 A1 * | 9/2004 | Perlow et al. | 370/278 |
| 2004/0190661 A1 * | 9/2004 | Vrazel | 375/350 |
| 2005/0002474 A1 * | 1/2005 | Limberg | 375/321 |
| 2006/0050816 A1 * | 3/2006 | Yang et al. | 375/346 |
| 2006/0088088 A1 * | 4/2006 | Liu et al. | 375/232 |
| 2006/0198326 A1 | 9/2006 | Yang et al. | |
| 2006/0198362 A1 * | 9/2006 | Molev-Shteiman et al. | 370/352 |
| 2006/0209986 A1 * | 9/2006 | Jensen et al. | 375/302 |
| 2006/0210003 A1 * | 9/2006 | Yang et al. | 375/350 |
| 2007/0053472 A1 * | 3/2007 | Feher | 375/347 |
| 2007/0183541 A1 * | 8/2007 | Moorti et al. | 375/341 |

OTHER PUBLICATIONS

Steven Hall, "Baseband Change Request for Medium Rate IP, Bluetooth Specification v 1.2", 2003.

* cited by examiner

METHOD AND SYSTEM FOR SELECTIVE EQUALIZATION ENABLEMENT BASED ON MODULATION TYPE

CROSS-REFERENCE TO RELATED APPLICATIONS/INCORPORATION BY REFERENCE

This application is a continuation of U.S. application Serial No. 11/112,983 filed Apr. 11, 2005, which claims the benefit of 60/623,956 filed Nov. 1, 2004.

This application also makes reference to U.S. Provisional Patent Application Ser. No. 60/624,019 filed Nov. 1, 2004.

The above stated applications are hereby incorporated herein by reference in their entirety.

FIELD OF THE INVENTION

Certain embodiments of the invention relate to Bluetooth wireless communications. More specifically, certain embodiments of the invention relate to a method and system for selective equalization enablement based on modulation type.

BACKGROUND OF THE INVENTION

Bluetooth is a short range wireless communications capability that enables connection between consumer and computer equipment while eliminating wires. Equipment that is enabled to utilize Bluetooth technology may be referred to as Bluetooth devices. Bluetooth devices within a range of approximately 10 meters of each other may communicate utilizing a 2.4 gigahertz frequency band. Examples of Bluetooth devices may comprise personal digital assistants (PDA), headsets, telephones, home audio equipment, and computers. Capabilities enabled by Bluetooth technology may comprise eliminating cables linking computers to printers, keyboards, and mouse devices, making calls from a wireless headset connected via wireless link to a wired or wireless telephone, and the playing of audio from a portable MP3 player via a home audiovisual system with no wired connection between the MP3 player and the home audiovisual system.

Bluetooth is designed to enable a plurality of Bluetooth devices to operate in a personal area network (PAN) environment. The plurality of Bluetooth devices in an environment may comprise a network known as a piconet. Within the approximately 10 meter range of Bluetooth technology a plurality of piconets may exist. Thus, Bluetooth technology may enable a plurality of piconets to coexisting within a home environment. For example, a first piconet may comprise computer equipment in a home environment, a second piconet may comprise audiovisual equipment in a home environment, a third piconet may comprise appliances in the home environment such as air conditioners, ovens, and lighting, and so forth.

Traditional Bluetooth enabled Bluetooth devices communicate at data rates of up to 1 megabit per second. Enhanced data rate Bluetooth may enable Bluetooth devices to communicate at data rates of up to 3 megabits per second.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for selective equalization enablement based on modulation type, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for selective equalization enablement based on modulation type. Aspects of a method and system for selective equalization enablement based on modulation type may be found in a method for processing a radio frequency (RF) signal that comprises receiving a Bluetooth signal via an RF channel, detecting a modulation type of the received Bluetooth signal, and selecting an equalization circuit for processing the received Bluetooth signal based on the detected modulation type. The method may also comprise determining a data rate based on the detected modulation type.

Figure 1A:
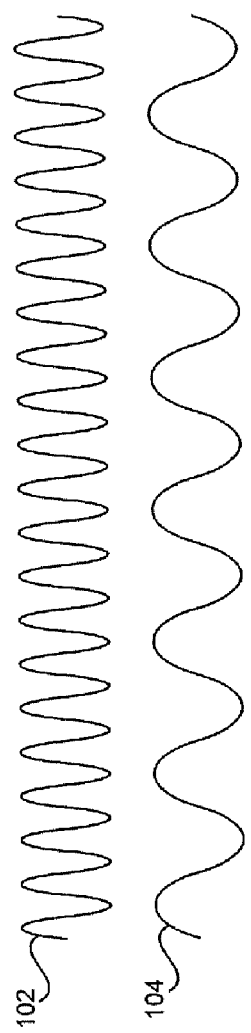
FIG. 1a is an exemplary illustration of signals for frequency shift keying, which may be utilized in connection with an embodiment of the invention.

FIG. 1a is an exemplary illustration of signals for frequency shift keying, which may be utilized in connection with an embodiment of the invention. With reference to FIG. 1a, there is shown a mark signal 102, and a space signal 104. In operation, frequency shift keying (FSK) may be utilized as a modulation type to transmit data by selecting a frequency of a carrier signal from one of a plurality of frequencies. For example, in binary FSK, one frequency may be identified as a mark frequency 102, while another frequency may be identified as the space frequency 104. In many conventional embodiments of binary FSK, the mark frequency 102 may represent a binary 1, while the space frequency 104 may represent a binary 0.

Figure 1B:
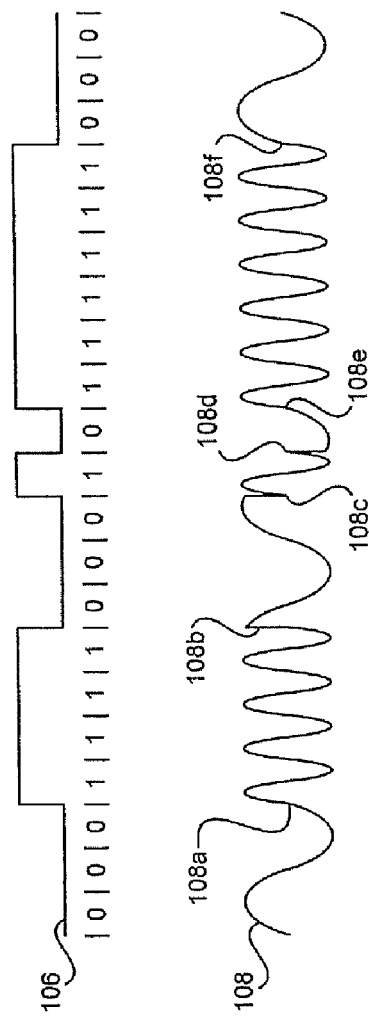
FIG. 1b is an exemplary illustration of frequency shift keying, which may be utilized in connection with an embodiment of the invention.

FIG. 1b is an exemplary illustration of frequency shift keying, which may be utilized in connection with an embodiment of the invention. With reference to FIG. 1b, there is shown a binary sequence 106, an FSK modulated signal 108, and a plurality of signal transitions 108a, 108b, 108c, 108d, 108e, and 108f. A sequence comprising a plurality of binary bits indicated as 0's and 1's may be indicated in the binary sequence 106. Also shown in the binary sequence 106 may be a square wave signal representation of the plurality of binary bits. The binary sequence 106 may be transmitted via a radio frequency (RF) channel as an FSK modulated signal 108. The frequency of the FSK modulated signal 108 may be equal to that of the space signal 104 when a binary 0 is being transmitted. The frequency of the FSK modulated signal 108 may be equal to the mark signal 102 when a binary 1 is being transmitted.

In the FSK modulated signal 108, some transitions from transmitting a binary 0 to transmitting a binary 1, or vice versa, may occur in-phase, such as, for example, signal transitions 108a, 108e, and 108f. In-phase signal transitions may occur when the value of the signal level mark frequency 102 at the time of the transition is equal to the value of the signal level of the space frequency 104. For signal transitions 108b, 108c, and 108d, the value of the signal level of the mark frequency 102 at the time of the transition may not be equal to the value of the signal level of the space frequency 104. At these times there may be discontinuity in the signal level of the FSK modulated signal 108, which may represent a sudden change in the signal level of the FSK modulated signal 108. These discontinuities may be represented by vertical lines that connect the discontinuous signal levels at signal transitions 108b, 108c, and 108d. Discontinuities in the FSK modulated signal 108 may comprise high frequency components that may reduce the spectral efficiency of signal transmission. As a result, a larger frequency bandwidth may be required to support transmission of information at a given data rate.

Figure 1C:
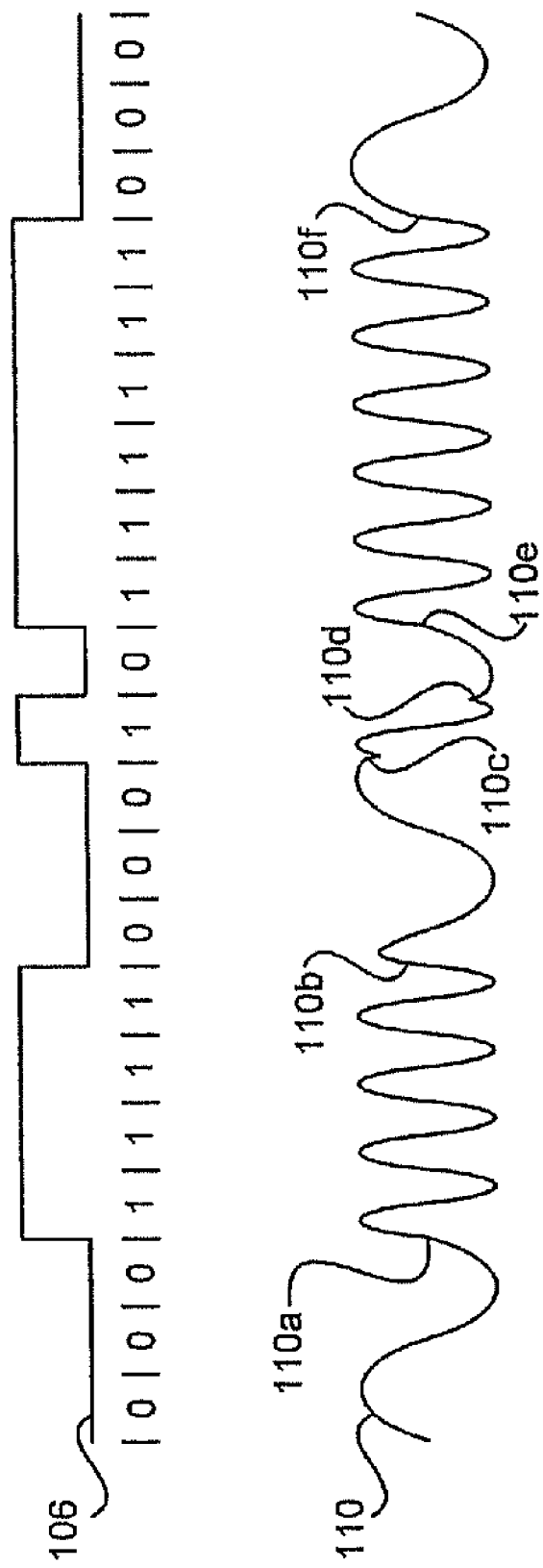
FIG. 1c is an exemplary illustration of Gaussian frequency shift keying, which may be utilized in connection with an embodiment of the invention.

FIG. 1c is an exemplary illustration of Gaussian frequency shift keying, which may be utilized in connection with an embodiment of the invention. With reference to FIG. 1c, there is shown a binary sequence 106, a Gaussian FSK (GFSK) modulated signal 110, and a plurality of signal transitions 110a, 110b, 110c, 110d, 110e, and 110f. The binary sequence 106 may be transmitted via a radio frequency (RF) channel as a GFSK modulated signal 110. The frequency of the GFSK modulated signal 110 may be equal to that of the space signal 104 when a binary 0 is being transmitted. The frequency of the GFSK modulated signal 110 may be equal to the mark signal 102 when a binary 1 is being transmitted.

The GFSK modulated signal 110 may by generated by processing an FSK modulated signal 108 by a Gaussian filter. The Gaussian filter may filter some high frequency components in the FSK modulated signal 108. This may result in a GFSK modulated signal 110 in which signal levels may change less rapidly.

In the GFSK modulated signal 110, some transitions from transmitting a binary 0 to transmitting a binary 1, or vice versa, may occur in-phase, such as, for example, signal transitions 110a, 110e, and 110f. For signal transitions 110b, 110c, and 110d, the value of the signal level of the mark frequency 102 at the time of the transition may not be equal to the value of the signal level of the space frequency 104. At these times the transition in the signal level of the GFSK modulated signal 110 may represent a less sudden change in the signal level than may be observed for signal transitions 108b, 108c, and 108d.

The filtering of high frequency components may also produce a GFSK modulated signal 110 characterized by a greater spectral efficiency than may be observed in the FSK modulated signal 108. Consequently, the GFSK modulated signal 110 may permit transmission of information at a given rate to be achieved with a lower required frequency bandwidth.

Figure 1D:
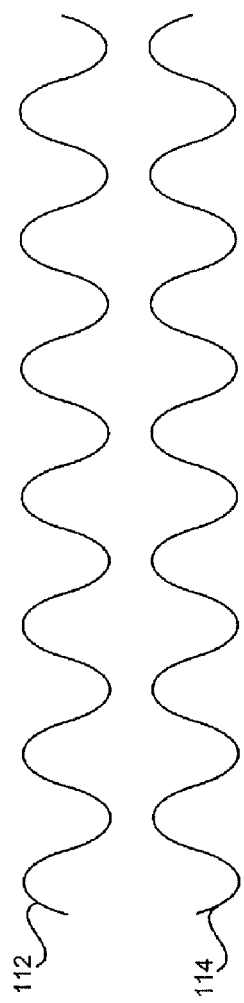
FIG. 1d is an exemplary illustration of signals for phase shift keying, which may be utilized in connection with an embodiment of the invention.

FIG. 1d is an exemplary illustration of signals for phase shift keying, which may be utilized in connection with an embodiment of the invention. With reference to FIG. 1d, there is shown a first phase signal 112, and a second phase signal 114. In operation, phase shift keying (PSK) may be utilized as a modulation type to transmit data by selecting a phase of a carrier signal at a given frequency from one of a plurality of phases. For example, in binary PSK, the first phase signal 112 may represent a signal comprising a phase shift of 0, while a second phase signal 114 may represent a signal comprising a phase shift of 180 degrees. The first phase signal 112 may represent a binary 0, while the second phase signal 114 may represent a binary 1.

Figure 1E:
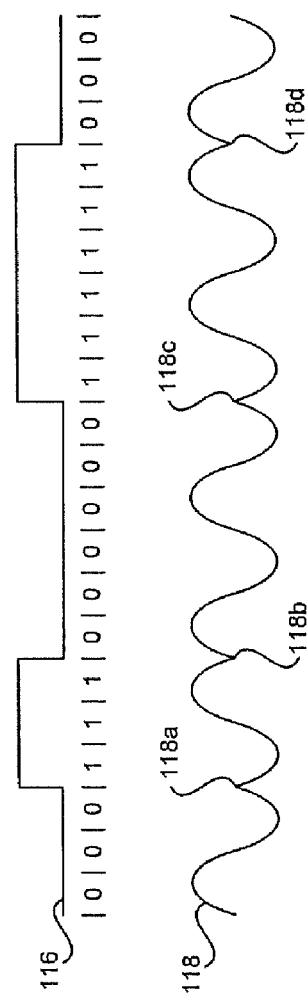
FIG. 1e is an exemplary illustration of phase shift keying, which may be utilized in connection with an embodiment of the invention.

FIG. 1e is an exemplary illustration of phase shift keying, which may be utilized in connection with an embodiment of the invention. With reference to FIG. 1e, there is shown a binary sequence 116, a PSK modulated signal 118, and a plurality of signal transitions 118a, 118b, 118c, and 118d. A sequence comprising a plurality of binary bits indicated as 0's and 1's may be indicated in the binary sequence 116. Also shown in the binary sequence 116 may be a square wave signal representation of the plurality of binary bits. The binary sequence 116 may be transmitted via a radio frequency (RF) channel as a PSK modulated signal 118. The phase of the PSK modulated signal 118 may be equal to that of the first phase signal 112 when a binary 0 is being transmitted. The phase of the PSK modulated signal 118 may be equal to the second phase signal 114 when a binary 1 is being transmitted.

A Bluetooth signal may utilize GFSK. Information communicated in a Bluetooth signal may be transmitted at a data rate of up to 1 megabit per second (Mbit/s). Enhanced data rate Bluetooth, which may also be known as EDR Bluetooth, or Bluetooth EDR, may achieve information data rates of 3 Mbits/s. EDR Bluetooth may utilize PSK. EDR Bluetooth may require that the Bluetooth signal be processed by equalization to compensate for transmission impairments that may occur in an RF channel for a Bluetooth signal characterized by data rates in excess of 1 Mbit/s.

Figure 2:
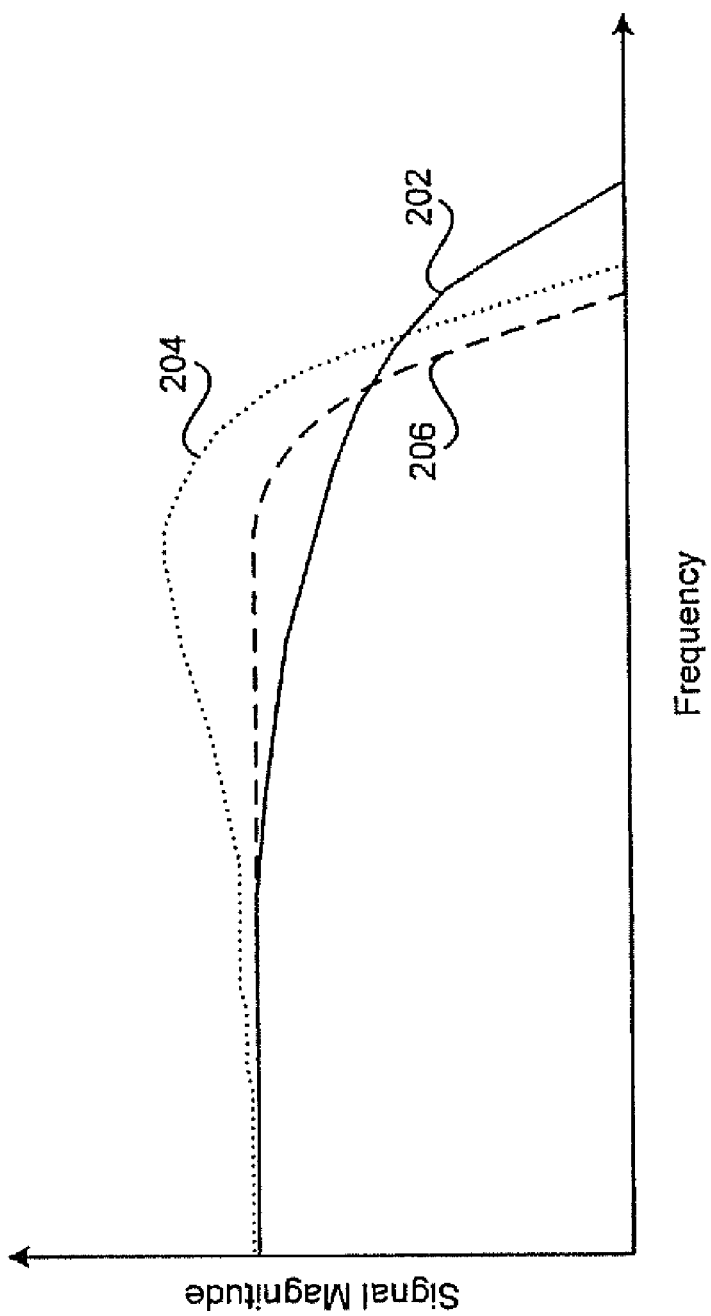
FIG. 2 is an exemplary illustration of equalization of a received signal, which may be utilized in connection with an embodiment of the invention.

FIG. 2 is an exemplary illustration of equalization of a received signal, which may be utilized in connection with an embodiment of the invention. With reference to FIG. 2, there is shown a received signal 202, an equalizer response curve 204, and a desired signal 206. The received signal 202 may represent a received RF signal based on an original transmitted signal. The equalizer response curve 204 may represent an equalizer response function for an equalizer circuit. The behavior represented by the equalizer response curve 204 may vary as a function of frequency. In this aspect, the equalizer response curve 204 may behave in such a manner that amplifies processed signals at certain frequencies while attenuating processed signals at other frequencies. The desired signal 206 may represent a desired received signal based on an original transmitted signal. Due to transmission impairments in an RF channel, a received signal 202 may represent the original transmitted signal at certain frequencies, but may not represent the original transmitted signal at other frequencies. An equalizer circuit may utilize an equalizer response function, as represented by the equalizer response curve 204, to process the received signal 202 to generate a desired signal 206, which may represent the original transmitted signal over a wider range of frequencies. Embodiments of the invention may not be limited in the method of equalization utilized to process a received signal, such as, for example, received signal 202.

Figure 3:
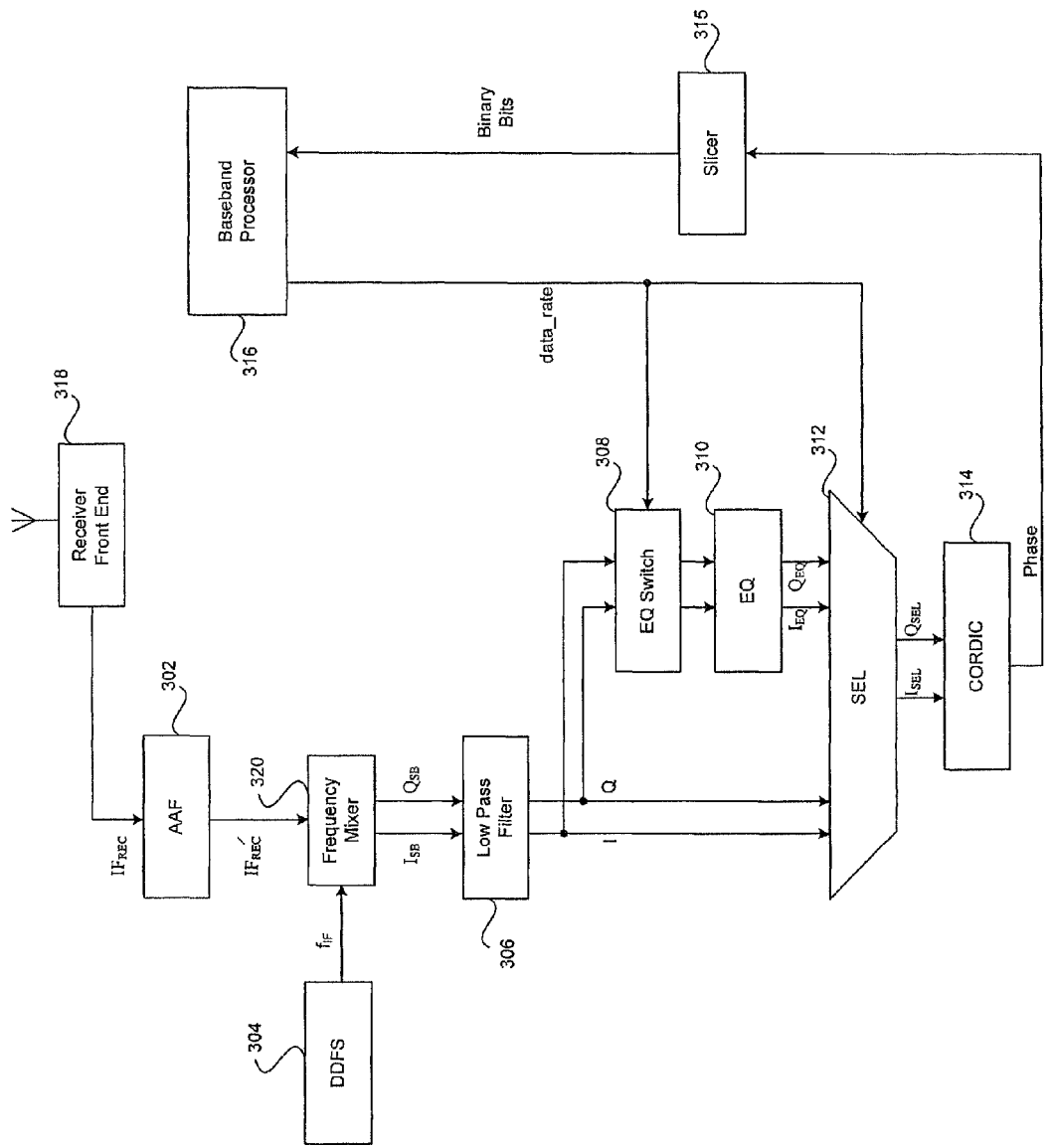
FIG. 3 is a block diagram illustrating a system for selective equalization enablement based on modulation type, in accordance with an embodiment of the invention.

FIG. 3 is a block diagram illustrating a system for selective equalization enablement based on modulation type, in accordance with an embodiment of the invention. The elements shown in FIG. 3 may comprise components that may be present in, for example, an embodiment of a Bluetooth receiver, which may also be referred to as a receiver. The elements shown in FIG. 3 may comprise components that may be present in an exemplary embodiment of a Bluetooth transmitter, which may also be referred to as a transmitter. A Bluetooth transceiver, which may also be referred to as a transceiver, may comprise components of a Bluetooth receiver and a Bluetooth transmitter that have been adapted and collocated in a single device. Embodiments of the invention may comprise a Bluetooth receiver, a Bluetooth transmitter, and a Bluetooth transceiver. Referring to FIG. 3 there is shown anti-aliasing filter (AAF) 302, a direct digital frequency synthesizer (DDFS) 304, a low pass filter (LPF) 306, an equalizer (EQ) switch 308, an equalizer 310, a selector (SEL) 312, a coordinate rotation digital computer (CORDIC) 314, a slicer 315, a baseband processor 316, a receiver front end (RFE) 318, and a frequency mixer 320.

The RFE 318 may comprise suitable logic, circuitry and/or code that may be adapted to receiving a Bluetooth signal transmitted via an RF channel, or transmitting a Bluetooth signal via an RF channel. The RFE 318 may downconvert a received RF signal to an input intermediate frequency (IF) signal, and/or may upconvert an output IF signal to an RF signal for transmission an RF channel. The RFE 318 may comprise an antenna, filtering, and analog to digital conversion (A/D) circuitry that may generate a received IF ($IF_{rec}$) signal. The signal $IF_{rec}$ may comprise a digital signal.

The AAF 302 may comprise suitable logic, circuitry and/or code that may be adapted to improve the quality of a received IF ($IF_{rec}$) signal by performing anti alias filtering to condition the received IF signal $IF_{rec}$ to reduce aliasing that may be present in the received signal. The AAF 302 may produce an anti alias filtered signal $IF'_{rec}$ that may comprise improvements based on the received IF signal $IF_{rec}$.

The DDFS 304 may comprise suitable logic, circuitry and/ or code that may be adapted to generate signals at a frequency that may be utilized to downconvert the active filtered signal $IF'_{rec}$ to baseband frequency. The DDFS 304 may generate an intermediate frequency signal, $f_{IF}$.

The frequency mixer 320 may comprise suitable logic, circuitry, and/or code that may be adapted to utilize an intermediate frequency signal $f_{IF}$ to generate a baseband signal by downconverting an anti alias filtered signal $IF'_{rec}$ from the AAF 302. After downconversion, the received signal may be represented as signals comprising an in-phase component signal, $I_{SB}$, and a quadrature component signal, $Q_{SB}$.

The LPF 306 may comprise suitable logic, circuitry, and/or code that may be adapted to downsample digital signals $I_{SB}$ and $Q_{SB}$ comprising a plurality of digital samples of an analog signal. The LPF 306 may produce low pass filtered signals comprising an in-phase component, I, and a quadrature component Q. The digital signal I may comprise fewer digital samples and a narrower frequency spectrum than the corresponding digital signal $I_{SB}$. The digital signal Q may comprise fewer digital samples and a narrower frequency spectrum than the corresponding digital signal $Q_{SB}$.

The EQ Switch 308 may comprise suitable logic, circuitry, and/or code that may be adapted to receive I and Q signals at the input of the EQ switch 308, and coupling the I and Q signals to the output of the EQ switch 308 based on a data_rate signal.

The EQ 310 may be adapted to perform equalization on I and Q signals received at the input of the EQ 310 to improve signal quality of the input I and Q signals. The EQ 310 may apply an equalizer response curve, such as, for example the equalizer response curve 204, to the input I and Q signals to generate equalized signals $I_{EQ}$ and $Q_{EQ}$ respectively.

The SEL 312 may comprise suitable logic, circuitry, and/or code that may be adapted to select from a plurality of pairs of input signals comprising I and Q, and $I_{EQ}$ and $Q_{EQ}$, based on a select signal which may be referred to as the data_rate signal. The selected non equalized baseband signals I and Q, or equalized baseband signals $I_{EQ}$ and $Q_{EQ}$ may be coupled to the selector output signals $I_{SEL}$ and $Q_{SEL}$ respectively.

The CORDIC 314 may comprise suitable logic, circuitry, and/or code that may be adapted to analyze input signals $I_{SEL}$ and $Q_{SEL}$ and to extract information content which may be contained in the input signals $I_{SEL}$ and $Q_{SEL}$. The CORDIC 314 may generate complex phase information based on the input signals $I_{SEL}$ and $Q_{SEL}$.

The slicer 315 may comprise suitable logic, circuitry, and/ or code that may be adapted to reconstitute bits of binary information based on complex phase information. The slicer 315 may map received complex phase information to a specific constellation point based on a modulation type. The constellation point may correspond to a representation of one or more binary bits of information. The slicer 315 may output the binary bits of information.

The baseband processor 316 may comprise suitable logic, circuitry, and/or code that may be adapted process the binary bits generated by the slicer 315. The baseband processor may structure a plurality of binary bits to form a media access control layer protocol data unit (MAC PDU). The baseband processor may analyze the binary information in a received MAC PDU.

In operation, an incoming Bluetooth signal may be received via an RF channel by an antenna at an RFE 318. The RFE 318 may process the received RF signal to generate a received IF signal $IF_{REC}$. The AAF 302 may perform anti alias filtering of the received RF signal to generate an anti alias filtered signal $IF'_{rec}$. The anti alias filtered signal $IF'_{rec}$ may be communicated to the frequency mixer 320. The DDFS 304 may generate an intermediate frequency signal, $f_{IF}$. The receiver frequency carrier signal $f_{IF}$ may be communicated to the frequency mixer 320.

The frequency mixer 320 may process the active filtered signal $IF'_{rec}$ utilizing the intermediate frequency signal $f_{CR}$ to generate a baseband signal. An original Bluetooth signal may have been a baseband signal, s, prior to transmission via an RF channel. The baseband signal may have been modulated by a transmitter signal $f_{CT}$ to generate an IF signal, $s(f_{CT})$ that may be transmitted via an RF channel. The received $IF'_{rec}$ signal, $\hat{s}(f_{CT})$, may be processed by the frequency mixer 320 to extract the baseband signal, $\hat{s}$. The frequency mixer 320 may process the received RF signal $\hat{s}(f_{CT})$ to generate signals at a plurality of carrier frequencies. The frequency mixer may generate a first version of the baseband signal $\hat{s}$ which has been modulated at a frequency equal to the difference of the frequencies of the transmitter signal and the receiver intermediate frequency signal $f_{CT}-f_{CR}$, $\hat{s}(f_{CT}-f_{CR})$. The frequency mixer may generate a second version of the baseband signal $\hat{s}$ which has been modulated at a frequency equal to the sum of the frequencies of the transmitter signal and the receiver intermediate frequency signal $f_{CT}+f_{CR}$, $\hat{s}(f_{CT}+f_{CR})$. The first version of the baseband signal $\hat{s}$ generated by the frequency mixer 320 may comprise a received baseband signal. Based on the signals $\hat{s}(f_{CT}-f_{CR})$ and $\hat{s}(f_{CT}+f_{CR})$ the frequency mixer 320 may generate an in-phase signal $I_{SB}$, and a quadrature signal $Q_{SB}$. The in-phase signal $I_{SB}$, and a quadrature signal $Q_{SB}$ may comprise frequency components $f_{CT}-f_{CR}$ and $f_{CT}+f_{CR}$. The frequency equal to the difference of the frequencies of the transmitter carrier signal and the receiver carrier signal $f_{CT}$-$f_{CR}$ may represent a lower frequency than that of the frequency equal to the sum of the frequencies of the transmitter carrier signal and the receiver carrier signal $f_{CT}$+$f_{CR}$.

The LPF 306 may process the in-phase signal $I_{SB}$, and quadrature signal $Q_{SB}$ to suppress the $f_{CT}$+$f_{CR}$ frequency component. The LPF 306 may generate an in-phase signal I, and a quadrature signal Q with a predominant frequency component equal to the difference of the frequencies of the transmitter carrier signal and the receiver carrier signal $f_{CT}$-$f_{CR}$. These signals, the in-phase signal I, and the quadrature signal Q, may comprise a received baseband signal.

The baseband processor 316 may receive binary bits from the slicer 315. The baseband processor 316 may structure a plurality of received binary bits to form a MAC layer PDU. The baseband processor 316 may analyze the contents of the MAC layer PDU. At the start of a communication with a peer Bluetooth device, via an RF channel, the baseband processor 316 may exchange information with the peer Bluetooth device to establish the modulation type that will be utilized to exchange subsequent information. The exchange of information to determine the modulation type is based on Bluetooth standards. The MAC PDUs received by the baseband processor 316 during this phase may comprise information that may be utilized to establish the modulation type. At the start of a communication GFSK modulation may be utilized to transmit information via the RF channel. When GFSK modulation is utilized, the selector 312 may select the low pass filtered signals I and Q to be communicated to the CORDIC 314. To enable this selection, the baseband processor 316 may generate a data_rate signal that instructs the selector SEL 312 to select the I and Q signals and to communicate those signals to the CORDIC 314. The data_rate signal may also instruct the EQ switch 308 to configure the EQ 310 in a power OFF state.

The CORDIC 314 may generate a complex phase signal based on the baseband signals $I_{SEL}$ and $Q_{SEL}$ from the SEL 312. The slicer 315 may utilize the generated complex phase signal to generate binary bits. As the baseband processor 316 receives and analyzes received binary bits, information may be extracted that may be utilized to determine the modulation type to exchange subsequent information. When PSK modulation is utilized the data rate for subsequent information exchange may exceed 1 Mbit/s. When GFSK modulation is utilized the data rate for subsequent information exchange may not exceed 1 Mbit/s. If the modulation type indicates that the data rate utilized for subsequent information exceeds 1 Mbit/s, the baseband processor may generate a data_rate signal that instructs the SEL 312 to select the equalized baseband signals $I_{EQ}$ and $Q_{EQ}$. The data_rate signal may also instruct the EQ switch 308 to configure the equalizer EQ 310 in a power ON state.

The EQ 312 may perform equalization on the baseband signals I and Q to improve the signal quality of the baseband signals. The EQ 312 may determine a process by which to improve the baseband signals I and Q based on, for example, a training sequence that may have been communicated in a Bluetooth signal received via an RF channel. The training sequence may comprise well-known information such that the EQ 312 may compare the information actually received in the training sequence via an RF channel in relation to the information that was expected based on the well-known information. Information derived during the training sequence may enable the EQ 312 to characterize the frequency response of the received signal, for example, as in the received signal 202 (FIG. 2). From this information, the EQ 312 may determine an equalizer response curve, for example, the equalizer response curve 204, which may be utilized to process subsequently received Bluetooth signals via the same RF channel. Equalization of the baseband signals I and Q may correct errors introduced in the received baseband signal, ŝ, due to transmission impairments in the RF channel that may produce differences between the information contained in the received baseband signal, ŝ, and the information contained in the originally transmitted baseband signal s. After processing the baseband signals I and Q, the EQ 310 may generate equalized baseband signals $I_{EQ}$ and $Q_{EQ}$. If the select signal data_rate has enabled the EQ switch 308 and the EQ 310 to process the baseband signals I and Q, the data_rate signal may control the SEL 312 to couple the equalized baseband signals $I_{EQ}$ and $Q_{EQ}$ from the EQ 310 to inputs to the CORDIC 314.

The baseband processor 316 may receive subsequent information comprising binary bits from the slicer 315. The binary bits may be extracted from baseband signals I and Q that may be processed based on the data_rate signal. The baseband processor 316 may structure the plurality of received binary bits from received subsequent information to form a MAC layer PDU. The baseband processor 316 may analyze the contents of the MAC layer PDU.

Figure 4:
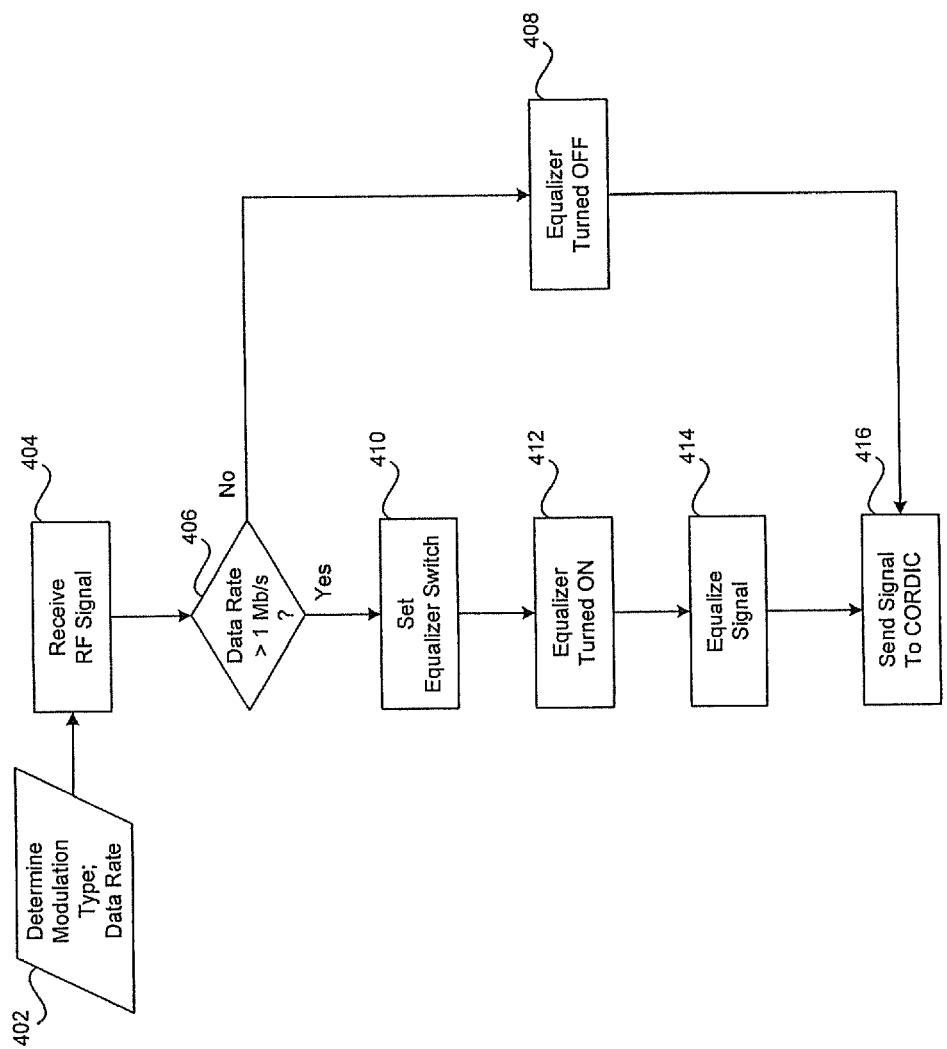
FIG. 4 is a flowchart illustrating exemplary steps for a system for selective equalization enablement based on modulation type, in accordance with an embodiment of the invention.

FIG. 4 is a flowchart illustrating exemplary steps for a system for selective equalization enablement based on modulation type, in accordance with an embodiment of the invention. Referring to FIG. 4, in step 402, the baseband processor 316 (FIG. 3) may determine the modulation type and data rate for subsequent information. In step 404, a Bluetooth signal may be received comprising subsequent information. Step 406 may determine whether the data rate is greater than 1 Mbit/s. If the data rate is greater than 1 Mbit/s, step 410 may set the equalizer switch 308 to couple the received baseband signals I and Q to inputs at the equalizer 310. In step 412, the equalizer 310 may be turned ON. In step 414, the baseband signals I and Q signals may be equalized to generate the baseband signals $I_{EQ}$ and $Q_{EQ}$. In step 416, the equalized baseband signals $I_{EQ}$ and $Q_{EQ}$ may be communicated to the CORDIC 416 via the selector SEL 312. If the data rate is determined to be not greater than 1 Mbit/s in step 408, the equalizer 310 may be turned OFF. In step 416, the baseband I and Q signals generated by the LPF 306 may be communicated to the CORDIC 314 via the SEL 312.

Various embodiments of the invention described herein may enable a Bluetooth receiver, transmitter, or transceiver to selectively enable equalization based on a modulation type. The modulation type may indicate the data rate of information being communicated in a Bluetooth signal. Therefore, various embodiments of the invention may enable a Bluetooth receiver, transmitter, or transceiver to selectively enable equalization based on a data rate. If the data rate is not greater than 1 Mbit/s, an equalizer may be disabled from processing the received Bluetooth signal. If the data rate is greater than 1 Mbit/s, the equalizer may be enabled to process the Bluetooth signal. If the data rate is not greater than 1 Mbit/s, the output may represent a low pass filtered received Bluetooth signal that has not been processed by equalization. If the data rate is greater than 1 Mbit/s, the output may represent a low pass filtered received Bluetooth signal that has been processed by equalization.

An aspect of the invention is that the utilization of an equalizer may enable a Bluetooth receiver, transmitter, or transceiver to achieve better performance as measured by, for example, information throughput rate, or bit error rate, for received Bluetooth signals in a receiver or transceiver, or for transmitted Bluetooth signals, in a transmitter or transceiver. Another aspect of the invention is that an equalizer switch may reduce power consumption in the Bluetooth receiver, transmitter, or transceiver by configuring the equalizer in a turned OFF state when the equalizer is disabled based on the data rate, and configuring the equalizer in a turned ON state when the equalizer is enabled based on the data rate.

In some conventional systems, no equalization may be performed on a received Bluetooth signal. Such systems may provide a lower level of performance for data rates that are greater than 1 Mbit/s. In other conventional systems, equalization may be performed on all received Bluetooth signals. Such systems may require an unnecessarily high level of power consumption because equalization of Bluetooth signals with data rates that are not greater than 1 Mbit/s may not provide a higher level of performance than systems that perform no equalization at data rates that are not greater than 1 Mbit/s. Various embodiments of the invention that utilize the selective enablement of equalization based on modulation type may enable a Bluetooth receiver, transmitter, or transceiver to maximize performance and minimize power consumption over a range of data rates.

Aspects of a system for processing a radio frequency (RF) signal may comprise circuitry that receives a Bluetooth signal via an RF channel, and a baseband processor that detects a modulation type of the received Bluetooth signal. The baseband processor may select an equalization circuit for processing the received Bluetooth signal based on the detected modulation type. The baseband processor may determine a data rate of the received Bluetooth signal based on the detected modulation type. The equalization circuit may equalize the received Bluetooth signal based on a determined data rate. The baseband processor may enable the equalization circuit via a switch. The equalization circuit may process the received Bluetooth signal based on the detected modulation type.

Other aspects of the system may comprise an equalizer switch that enables the equalization circuit for processing of the received Bluetooth signal, if a detected data rate of the detected modulation type is greater than about 1 megabit per second. The equalizer switch may disable the equalization circuit for processing of the received Bluetooth signal, if a detected data rate of the detected modulation type is less than about 1 megabit per second. The equalizer switch may configure the equalization circuit in a power turned OFF state. A selector circuit may select an output signal based on the detected modulation type. The selector circuit may select the output signal from an equalized received Bluetooth signal, if a detected data rate of the detected modulation type is greater than about 1 megabit per second. The selector circuit may select the output signal from a non-equalized received Bluetooth signal, if a detected data rate of the detected modulation type is less than about 1 megabit per second.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing a radio frequency (RF) signal, the method comprising:
performing by one or more processors and/or circuits:
detecting a modulation type for at least a portion of signals that are received via an RF channel;
determining whether to enable or disable an equalization circuit for processing at least a subsequent portion of said received signals based on said detected modulation type; and
selecting one of a plurality of inputs to a selector based on said detected modulation type, wherein said plurality of inputs comprise said at least a subsequent portion of said received signals and an output signal generated by said equalization circuit.

2. The method according to claim 1, comprising performing by said one or more processors and/or circuits, selectively configuring said equalization circuit in a power ON state when said equalization circuit is enabled.

3. The method according to claim 2, comprising performing by said one or more processors and/or circuits, selectively configuring said equalization circuit in said power ON state when said detected modulation type is Gaussian frequency shift keying (GFSK).

4. The method according to claim 3, comprising performing by said one or more processors and/or circuits, determining that a data rate for said at least a subsequent portion of said received signals is less than or equal to 1 megabit per second when said detected modulation type is said Gaussian frequency shift keying (GFSK).

5. The method according to claim 2, comprising performing by said one or more processors and/or circuits, generating an equalized signal based on said at least a subsequent portion of said received signals when said equalization circuit is selectively configured in said power ON state.

6. The method according to claim 5, wherein said output signal generated by said equalization circuit comprises said generated equalized signal.

7. The method according to claim 2, comprising performing by said one or more processors and/or circuits, selecting said one of said plurality of inputs corresponding to said output signal generated by said equalization circuit when said equalization circuit is selectively configured in said power ON state.

8. The method according to claim 1, comprising performing by said one or more processors and/or circuits, selectively configuring said equalization circuit in a power OFF state when said equalization circuit is disabled.

9. The method according to claim 8, comprising performing by said one or more processors and/or circuits, selectively configuring said equalization circuit in said power OFF state when said detected modulation type is phase shift keying (PSK).

10. The method according to claim 9, comprising performing by said one or more processors and/or circuits, determining that a data rate for said at least a subsequent portion of said received signals is greater than 1 megabit per second when said detected modulation type is said phase shift keying (PSK).

11. The method according to claim 8, comprising performing by said one or more processors and/or circuits, selecting said one of said plurality of inputs corresponding to said at least a subsequent portion of said received signals when said equalization circuit is selectively configured in said power OFF state.

12. A system for processing a radio frequency (RF) signal, the system comprising:
one or more circuits comprising an equalization circuit and a selector, wherein said one or more circuits are operable to detect a modulation type for at least a portion of signals that are received via an RF channel;
said one or more circuits are operable to determine whether to enable or disable said equalization circuit for processing at least a subsequent portion of said received signals based on said detected modulation type; and
said one or more circuits are operable to select one of a plurality of inputs to said selector based on said detected modulation type, wherein said plurality of inputs comprise said at least a subsequent portion of said received signals and an output signal generated by said equalization circuit.

13. The system according to claim 12, wherein said one or more circuits are operable to selectively configure said equalization circuit in a power ON state when said equalization circuit is enabled.

14. The system according to claim 13, wherein said one or more circuits are operable to selectively configure said equalization circuit in said power ON state when said detected modulation type is Gaussian frequency shift keying (GFSK).

15. The system according to claim 14, wherein said one or more circuits are operable to determine that a data rate for said at least a subsequent portion of said received signals is less than or equal to 1 megabit per second when said detected modulation type is said Gaussian frequency shift keying (GFSK).

16. The system according to claim 13, wherein said one or more circuits are operable to generate an equalized signal based on said at least a subsequent portion of said received signals when said equalization circuit is selectively configured in said power ON state.

17. The system according to claim 16, wherein said output signal generated by said equalization circuit comprises said generated equalized signal.

18. The system according to claim 13, wherein said one or more circuits is operable to select said one of said plurality of inputs corresponding to said output signal generated by said equalization circuit when said equalization circuit is selectively configured in said power ON state.

19. The system according to claim 12, wherein said one or more circuits are operable to selectively configure said equalization circuit in a power OFF state when said equalization circuit is disabled.

20. The system according to claim 19, wherein said one or more circuits are operable to selectively configure said equalization circuit in said power OFF state when said detected modulation type is phase shift keying (PSK).

21. The system according to claim 20, wherein said one or more circuits are operable to determine that a data rate for said at least a subsequent portion of said received signals is greater than 1 megabit per second when said detected modulation type is said phase shift keying (PSK).

22. The system according to claim 19, wherein said one or more circuits are operable to select said one of said plurality of inputs corresponding to said at least a subsequent portion of said received signals when said equalization circuit is selectively configured in said power OFF state.

* * * * *